United States Patent [19]
Ehlig et al.

[11] Patent Number: 5,551,050
[45] Date of Patent: Aug. 27, 1996

[54] SYSTEM AND METHOD USING SYNCHRONIZED PROCESSORS TO PERFORM REAL TIME INTERNAL MONITORING OF A DATA PROCESSING DEVICE

[75] Inventors: Peter N. Ehlig, Houston; Gary L. Swoboda, Sugar Land, both of Tex.

[73] Assignee: Texas Instruments Incorporated, Dallas, Tex.

[21] Appl. No.: 339,424

[22] Filed: Nov. 14, 1994

Related U.S. Application Data

[63] Continuation of Ser. No. 928,145, Aug. 11, 1990, abandoned, which is a continuation of Ser. No. 453,450, Dec. 20, 1989, abandoned.

[51] Int. Cl.[6] .................................................. G06F 11/00
[52] U.S. Cl. ................... 395/800; 395/500; 395/182.09; 364/230.6; 364/240.0; 364/264.1; 364/266.0; 364/269.0; 364/DIG. 1
[58] Field of Search ................................ 395/800, 775, 395/725, 575, 500, 425, 275, 525, 827, 835, 840, 287, 474, 550, 182.09, 182.10, 184.01, 185.01; 371/2.2, 5.4, 8.1, 9.1, 10.1, 11.3, 16.2, 16.5, 21.1, 21.6, 29.1, 36, 40.1, 42, 46, 67.1, 68.3; 364/131–134, 183, 184, 187

[56] References Cited

U.S. PATENT DOCUMENTS

| | | | |
|---|---|---|---|
| 4,141,066 | 2/1979 | Keiles | 364/119 |
| 4,251,873 | 2/1981 | Joby | 364/741 |
| 4,358,823 | 11/1982 | McDonald et al. | 395/575 |
| 4,435,759 | 3/1984 | Baum et al. | 395/250 |
| 4,571,677 | 2/1986 | Hirayama et al. | 364/200 |
| 4,581,701 | 4/1986 | Hess et al. | 364/187 |
| 4,628,445 | 12/1986 | Buonomo et al. | 364/200 |
| 4,674,089 | 6/1987 | Poret et al. | 371/25 |
| 4,941,087 | 7/1990 | Kap | 364/200 |
| 5,005,174 | 4/1991 | Bruckert et al. | 371/68.3 |
| 5,008,805 | 4/1991 | Fiebig et al. | 364/184 |
| 5,054,026 | 10/1991 | Tsubota | 371/68.3 |
| 5,101,498 | 3/1992 | Ehlig et al. | 395/800 |
| 5,109,333 | 4/1992 | Kubota et al. | 395/275 |
| 5,115,502 | 5/1992 | Tallman | 395/500 |
| 5,132,971 | 7/1992 | Oguma et al. | 395/183.04 |
| 5,146,589 | 9/1992 | Peet, Jr. et al. | 395/575 |

*Primary Examiner*—Alpesh M. Shah
*Attorney, Agent, or Firm*—Scott B. Stahl; Robby T. Holland; Richard L. Donalson

[57] ABSTRACT

A system and method for real time internal bus monitoring of a data processing device is disclosed. A plurality of processors having address outputs, data lines, and clocks are connected to a synchronizing circuit to lock the clocks of the processors in phase. A memory is connected to all of the data lines in common and is connected to the address outputs of fewer than all of the processors. Emulation circuitry is connected to the address outputs of a processor instead of said memory. The method discloses synchronizing the processors by locking the clocks in phase. Then accessing the system memory by addressing it with the address output of only one of the processors. And finally, monitoring at least one of the other processors via its address output.

2 Claims, 3 Drawing Sheets

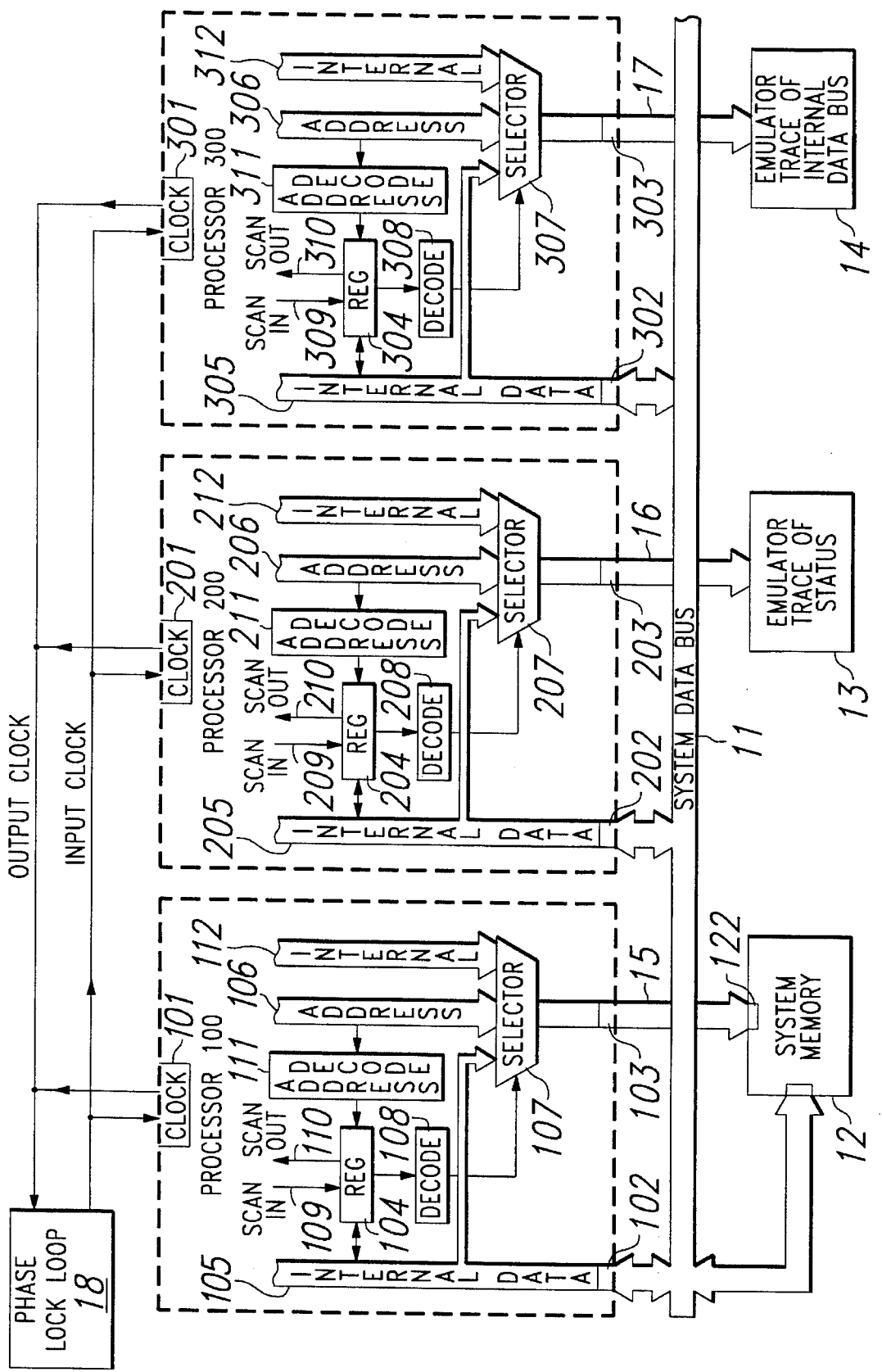

SYSTEM AND METHOD USING SYNCHRONIZED PROCESSORS TO PERFORM REAL TIME INTERNAL MONITORING OF A DATA PROCESSING DEVICE

This is a continuation of Ser. No. 07/928,145, filed Aug. 11, 1990, now abandoned, which is a continuation of Ser. No. 07/453,450, filed Dec. 20, 1989, now abandoned.

NOTICE (C) Copyright 1989 Texas Instruments Incorporated. A portion of the disclosure of this patent document contains material which is subject to copyright protection. The copyright owner has no objection to the facsimile reproduction by anyone of the patent disclosure, as it appears in the Patent and Trademark office patent file or records, but otherwise reserves all copyright rights whatsoever.

INCORPORATION BY REFERENCE

This application incorporates by reference the following co-assigned applications:

| Ser. No. | U.S. Pat. No. | TI Docket No. | Filing Date | Issue Date |
|---|---|---|---|---|
| 06/350,852 | 4,577,282 | T-09062 | 02/22/82 | 03/18/86 |
| 06/701,827 | 4,713,748 | T-10731 | 02/12/85 | 12/15/87 |
| 07/025,417 | 4,912,636 | T-11961 | 03/13/87 | 3/27/90 |
| 07/093,463 | N/A | T-12698 | 09/04/87 | N/A |
| 07/387,549 | N/A | T-14146 | 07/31/89 | N/A |

FIELD OF THE INVENTION

This invention relates to data processing devices and specifically to a data processing system.

BACKGROUND OF THE INVENTION

A microprocessor device is a central processing unit or CPU for a digital processor which is usually contained in a single semiconductor integrated circuit or "chip" fabricated by MOS/LSI technology, as shown in U.S. Pat. No. 3,757, 306 issued to Gary W. Boone and assigned to Texas Instruments. The Boone patent shows a single-chip 8-bit CPU including a parallel ALU, registers for data and addresses, an instruction register and a control decoder, all interconnected using the yon Neumann architecture and employing a bidirectional parallel bus for data, address and instructions. U.S. Pat. No. 4,074,351, issued to Gary W. Boone, and Michael J. Cochran, assigned to Texas Instruments, shows a single-chip "microcomputer" type device which contains a 4-bit parallel ALU and its control circuitry, with on-chip ROM for program storage and on-chip RAM for data storage, constructed in the Harvard architecture. The term microprocessor usually refers to a device employing external memory for program and data storage, while the term microcomputer refers to a device with on-chip ROM and RAM for program and data storage. In describing the instant invention, the term "microcomputer" will be used to include both types of devices, and the term "microprocessor" will be primarily used to refer to microcomputers without on-chip ROM; both terms shall be used since the terms are often used interchangeably in the art.

Modern microcomputers can be grouped into two general classes, namely general-purpose microprocessors and special-purpose microcomputers/microprocessors. General purpose microprocessors, such as the M68020 manufactured by Motorola, Inc., are designed to be programmable by the user to perform any of a wide range of tasks, and are therefore often used as the central processing unit in equipment such as personal computers. Such general-purpose microprocessors, while having good performance for a wide range of arithmetic and logical functions, are of course not specifically designed for or adapted to any particular one of such functions. In contrast, special-purpose microcomputers are designed to provide performance improvement for specific predetermined arithmetic and logical functions for which the user intends to use the microcomputer. By knowing the primary function of the microcomputer, the designer can structure the microcomputer in such a manner that the performance of the specific function by the special-purpose microcomputer greatly exceeds the performance of the same function by the general-purpose microprocessor regardless of the program created by the user.

One such function which can be performed by a special-purpose microcomputer at a greatly improved rate is digital signal processing, specifically the computations required for the implementation of digital filters and for performing Fast Fourier Transforms. Because such computations consist to a large degree of repetitive operations such as integer multiply, multiple-bit shift, and multiply-and-add, a special-purpose microcomputer can be constructed specifically adapted to these repetitive functions. Such a special-purpose microcomputer is described in U.S. Pat. No. 4,577,282, assigned to Texas Instruments Inc. The specific design of a microcomputer for these computations has resulted in sufficient performance improvement over general purpose microprocessors to allow the use of such special-purpose microcomputers in real-time applications, such as speech and image processing.

Different techniques are used by designers to further increase the rate of processing digital signals. Some designers design the data processing device around parallel architectures that run multiple internal busses within the data processing device. Implementing this technique requires a data processing device having a much higher pin count and larger power supply handling capabilities than normal. This technique also causes difficulties in the development of tools for emulating the data processing device.

Some designers are implementing more resources onto the microcomputer chip thereby avoiding delays in the accessing of off-chip resources. Memories, such as ROM and RAM, have been added on chip as well as the addition of on chip status registers. While data processing speed is substantially increased in such arrangements, the development of tools for emulating the data processing device becomes much more difficult.

Two major techniques currently exist in aiding the development of tools for emulating a data processing device. One technique suggest running a special extended pin out data processing device. This technique is not advantageous and is not cost effective. It requires that either multiple devices be developed (one for production purposes and one for emulation purposes) or, that only the extended pin out device be developed. The extended pin out device is less reliable and require more power. As such a device is designed to have more internal buses, the pinout increases until it is not feasible to build an emulator for it.

Another technique to solve the problem is to emulate at less than full speed. The internal information can be dumped out of the data processing device during program execution with the use of the standard buses on the data processing device. However, this technique requires a considerable slowing down of the execution of the program by the data processing device. In real time applications, this technique is unacceptable.

It would be advantageous, therefore, to facilitate emulation of data processing devices as more and more resources are moved onto the microcomputer chip.

It is an object therefore of this invention to aid designers in the development of emulation tools for data processing devices.

Further objects and advantages of the instant invention will become apparent to those of ordinary skill in the art having reference to the following specification, together with its drawings.

SUMMARY OF THE INVENTION

A system for real time internal bus monitoring of a data processing device provides a plurality of processors having address outputs, data lines, and clocks connected to a synchronizing circuit to lock the clocks of the processors in phase. A memory is connected to all of the data lines in common and is connected to the address outputs of fewer than all of the processors. Emulation circuitry is connected to the address outputs of a processor instead of the memory.

An inventive method synchronizes the processors by locking the clocks in phase. Then the system memory is accessed by addressing it with the address output of only one of the processors. At least one of the other processors is monitored via its address output.

BRIEF DESCRIPTION OF THE DRAWINGS

The present invention will be described with reference to the accompanying drawings, wherein:

FIG. 1 is an electrical diagram, in block form, of a data processing system constructed according to the invention.

Corresponding numerals and other symbols refer to corresponding parts and steps in the various Figures of the drawing except where the context indicates otherwise.

DESCRIPTION OF THE PREFERRED EMBODIMENTS

Figure 2A:
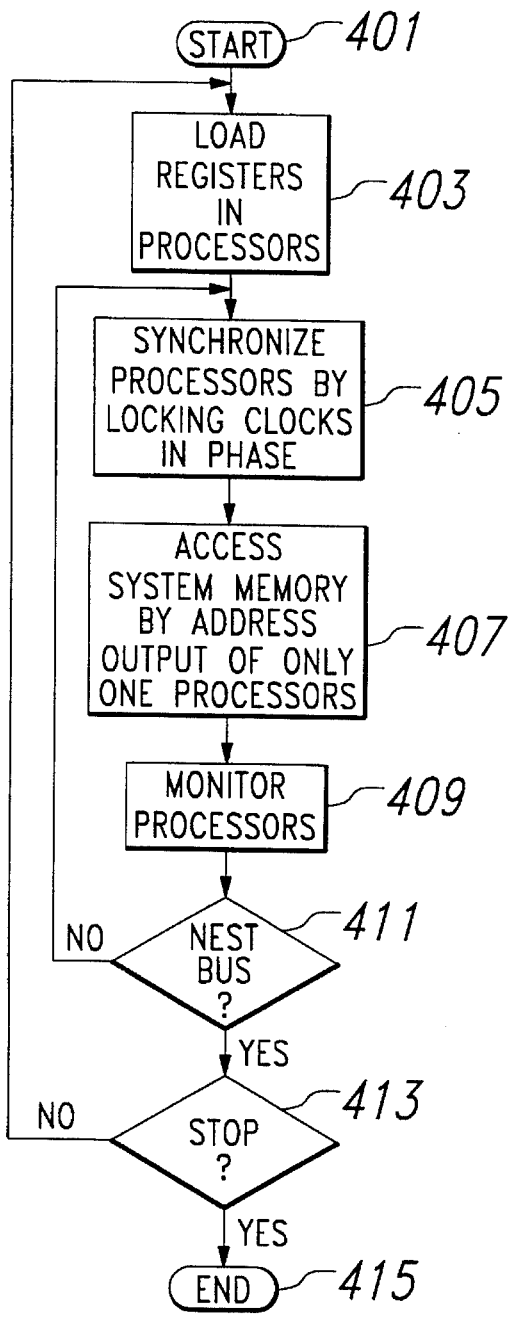
FIGS. 2a and 2b are flow diagrams depicting methods of operating the system of FIG. 1.

FIG. 1 is a block diagram drawing of a data processing system in which real time internal bus monitoring occurs as an aid to emulation development.

FIG. 1 discloses three data processors: data processor 100; data processor 200; and data processor 300. Data processors 100, 200, and 300 of FIG. 1 suitably are Texas Instruments, Incorporated TMS 320C25 Digital Signal Processors improved as further described herein. The principles disclosed herein are applicable to improving processors and systems generally, however. Some processors of Texas Instruments, Incorporated are disclosed in incorporated U.S. Pat. Nos. 4,577,282 and 4,713,748 as well as application Ser. No. 025,417, now U.S. Pat. No. 4,912,636.

Data processor 100 of FIG. 1 has a clock 101, a data input/output 102, an address output 103, a register 104, an internal data bus 105, an address bus 106, a selector 107, a decoder 108, a signal line Scan In 109, a signal line Scan Out 110, an address decoder 111, and a second internal bus 112. Internal data bus 105 is connected to data input/output 102 and is bidirectionally connected for access to register 104. Register 104 also has as a serial input signal line Scan In 109. Register 104 is address mapped meaning that it is accessible for read or write to internal data bus 105 when address decoder 111 is activated by the address of register 104 on address bus 106. The output of register 104 is connected to decoder 108. Signal line Scan Out 110 exits register 104 and may be advantageously connected to other registers, not shown, of data processor 100. Selector 107 receives as inputs internal data bus 105, address bus 106 and second internal bus 112. The output of decoder 108 determines the selection of internal data bus 105, address bus 106, or second internal bus 112 made by selector 107. The output of selector 107 is connected to address output 103.

Data processors 200 and 300 of FIG. 1 are illustratively identical in construction to processor 100 and their components are respectively enumerated analogously with 200 and 300 numbers.

The output clock signals of clock 101 of data processor 100, clock 201 of data processor 200, and clock 301 of data processor 300 are input to a phase lock loop generator 18 of FIG. 1. The output signal of phase lock loop generator 18 is input to clocks 101, 201, and 301. Clocks 101, 201, and 301 provide the timing signals for the respective operation of data processors 100, 200, and 300. As is well known, phase lock loop generator 18 is responsive to its inputs and continuously adjusts its output signal so that the circuits receiving its output signal become synchronized and operate in phase. Thus the clock signal generated by phase lock loop generator 18 and received by clocks 101, 201, and 301 locks clocks 101, 201, and 301 in phase so that the timing signals of data processors 100, 200, and 300 are all synchronized. When configured in such synchronized manner, data processors 100, 200, and 300 execute their programs in a "lock step" mode. In a "lock step" mode of operation, data processors 100, 200, and 300 will each execute their instructions at the same time.

In another embodiment, data processors 100, 200, and 300 could be constructed so that they have synchronizing circuits within each data processor. The synchronizing circuits within each data processor could be connected to "sync" pins for external access. Data processors 100, 200, and 300 could then be locked in phase by connecting their "sync" pins together.

Data input/output 102 of data processor 100 of FIG. 1 is connected to a system data bus 11. Also connected to system data bus 11 are data input/output 202 of data processor 200 and data input/output 302 of data procesor 300. System data bus 11 is connected to a data input/output 121 of a system memory 12. Address output 103 of data processor 100 is connected to a bus 15. Bus 15 is connected to an address input 122 of system memory 12.

Address output 203 of data processor 200 of FIG. 1 is connected to a bus 16. Bus 16 is connected to an emulator circuit 13.

Address output 303 of data processor 300 of FIG. 1 is connected to a bus 17. Bus 17 is connected to an emulator circuit 14.

In FIG. 1 data input/output 102 of data processor 100, data input/output 202 of data processor 200, and data input/output 302 of data processor 300 are all connected to system data bus 11 and only address output 103 of data processor 100 is connected to system memory 12. Accordingly, when data processors 100, 200, and 300, are running in the real time lock step mode (where they are synchronized in phase), data processor 100 sends out the addresses to access in system memory 12 and data processors 100, 200, and 300 all simultaneously read the data in system memory 12. This operation occurs in real time. Data processors 100, 200, and 300, all simultaneously execute and because they are advantageously identical processors, they behave in the same fashion.

The five tabulated coassigned applictions describe background emulation concepts. Also, incorporated application Ser. No. 07/387,549 now abandoned, describes the operation of signal lines Scan In 109 and Scan Out 110 in conjunction with register 104.

Thus register 104, signal line Scan In 109, and signal line Scan Out 110 advantageously allow data processors 200 and 300 to be loaded and "tested" as they operate.

Register 104 is also addressable through address decoder 111 and is responsive to instructions to activate decoder 108. Decoder 108 then causes selector 107 to connect internal data bus 105, address bus 106, or status bus 112 to address output 103. In the example of FIG. 1, selector 107 connects address bus 106 to address output 103. Therefore, address outputs issued by data processor 100 travel through bus 15 to address input 122 of system memory 12.

In the example of FIG. 1, selector 207 connects second internal bus 212 to address output 203. This configuration allows emulator circuit 13 to trace the status of operations performed by identical data processors 100, 200, and 300 as they execute in lock step mode.

In the example of FIG. 1, selector 307 connects internal data bus 305 to address output 303. This configuration allows emulator circuit 14 to trace the actual internal data traveling within data processors 100, 200, and 300 as they execute in lock step mode.

The system of FIG. 1 greatly aids designers in developing emulation tools for data processors. The system does not have to slow down for emulation and may run at full speed. Real time monitoring advantageously occurs. The data processors are tested as they operate at full speed while monitored in real time.

Figure 2B:
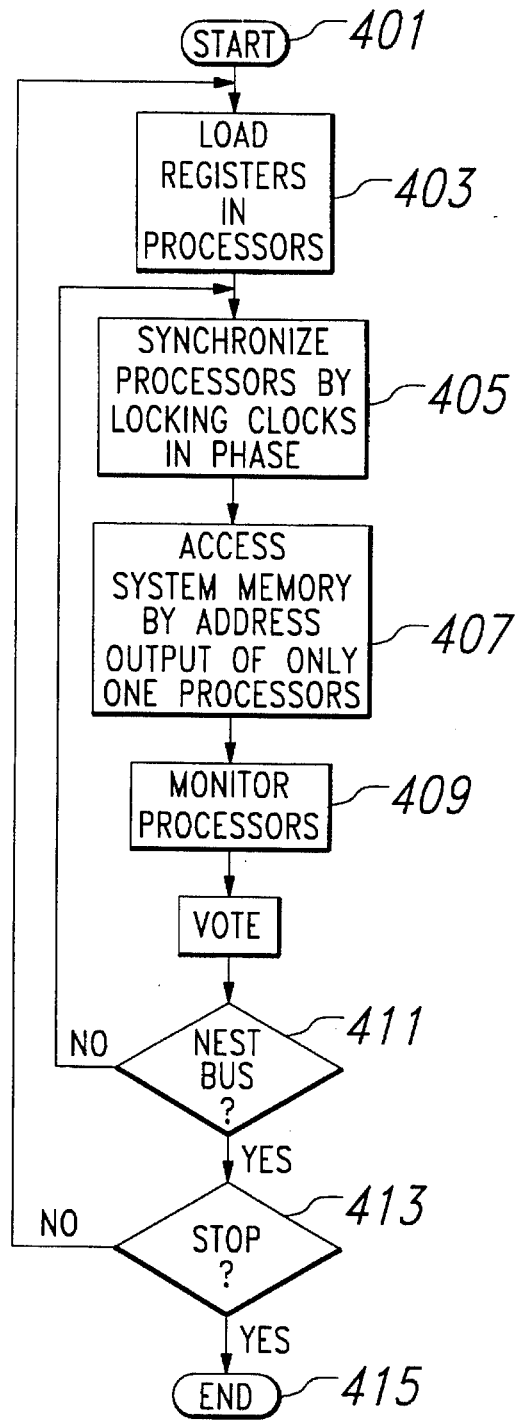

FIGS. 2a and 2b are flow diagrams depicting methods of operating the data processing system of FIG. 1.

In FIG. 2a operations commence with Start 401. In a step 403, the registers 104, 204, and 304 are scan loaded or loaded from internal data bus 105, 205, and 305. In a step 405, data processors 100, 200, and 300 are synchronized by locking their respective clocks 101, 201, and 301 in phase. In a step 407, system memory 12 is accessed with the data lines 105, 205, and 305 by addressing system memory 12 with only the address output 103 of data processor 100. In a step 409, the data processing system of FIG. 1 is monitored through the address output 203 and/or 303 of at least data processor 200, or 300. The monitoring includes switching an internal bus (internal data bus 105, address bus 106, second internal bus 112, internal data bus 105, address bus 205, second internal bus 212, data bus 305, address bus 306 or second internal bus 312) to the address output of each data processor to make internal bus data available for emulation purposes. In step 409, the monitoring includes supplying data from at least one of the other processors to its address output to the emulation trace circuit. In a step 411, a decision is made as to wheather another bus will be monitored. If another bus is not monitored, the process repeats beginning with step 405. If another bus is chosen to be monitored, in a step 413, a decision is made as to wheather to stop the process. If the process is not stopped, then the process repeats beginning with step 403. If the process is stopped, then the monitoring ends in a step 415.

FIG. 2b adds a step wherein step 409 monitoring occurs in normal operation and then added step 410 performs a voting operation.

Figure 3:
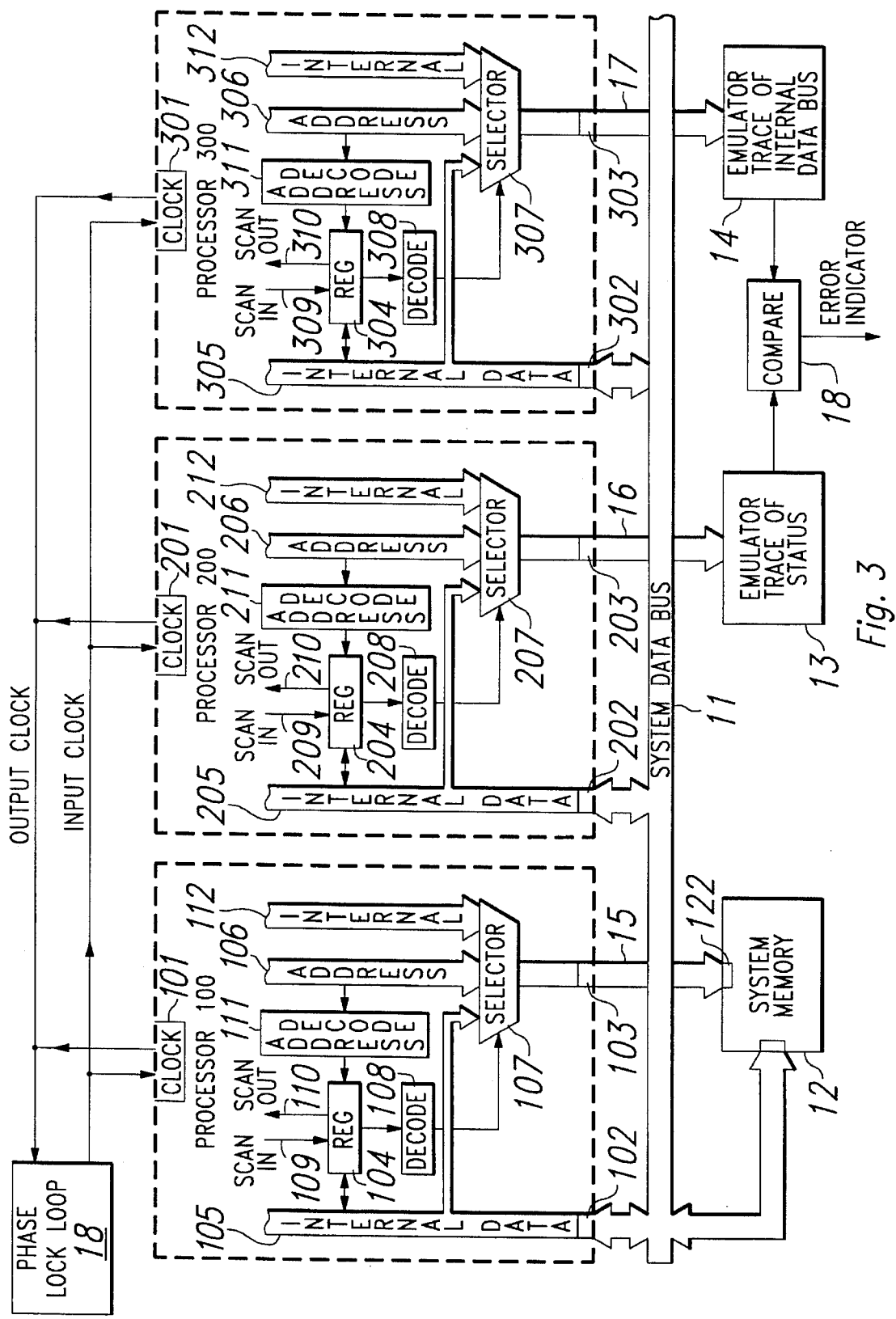
FIG. 3 is an electrical diagram, in block form, of a voting data processing system according to the invention.

FIG. 3 illustrates an embodiment of the invention that is useful in redundant processing applications where multiple processors are calculating the same information and voting on the answer. The embodiment disclosed in FIG. 3 adds a compare device 18 receiving input from emulator circuit 13 and emulator circuit 14 to the embodiment disclosed in FIG. 1. The compare device 18 has an error indicate output. In this embodiment, selector 207 connects internal data bus 205 to address output 203 and selector 307 connects internal data bus 305 to address output 303. The system is otherwise configured as explained for the embodiment of FIG. 1. In the system disclosed in FIG. 3, compare device continuously compares the internal data produced by data processor 200 and data processor 300. Compare device 18 produces a signal on its error indicate output when the internal data it compares is different.

It should be understood that various embodiments of the invention can employ hardware, software or microcoded firmware. Process and state transition diagrams herein are also representative of diagrams for microcoded and software based embodiments. Connections and couplings can be ohmic, direct, electrical, capacitive, digital, or analog interfacing, electromagnetic, optical or by any other suitable means.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to this description. It is therefore contemplated that the appended claims cover any such modifications or embodiments as fall within the true scope of the invention.

What is claimed is:

1. A method of operating a data processing system including a plurality of processors each having an address output, data lines, and a clock, comprising the steps of:

synchronizing the plurality of processors by locking the clock of each of said plurality of processors in phase;

accessing data from a system memory connected to the data lines of the plurality of processors by addressing the data in the system memory with the address output of a first of said plurality of processors and providing the addressed data to each of said processors;

monitoring internal operations of said plurality of processors via the address output of a second of said plurality of processors;

operating the plurality of processors redundantly so that each processor arrives at an answer by calculating identical data from said data lines; and supplying the answer of the second of said plurality of processors and the answer of a third of said plurality of processors through their address outputs which are not connected to the system memory to a comparison circuit, and voting on the answers supplied through their address outputs to create an error flag when a discrepancy occurs between the answers.

2. A data processing system configured to operate in lock step such that one processor sends out addresses for reading data while other processors use their address outputs for transmitting internal information, comprising:

a system memory;

a system data bus connected to the system memory;

a clock synchronization circuit;

a first processor having a clock, an address output, and a data input/output, the clock connected to the clock synchronization circuit, the address output connected to the system memory; and the data input/output connected through the system data bus to the system memory;

a second processor having a clock, an address output, a data input/output, and an internal status bus, the clock connected to the clock synchronization circuit, the address output connected to a first monitor circuit, the data input/output connected through the system data bus to the system memory, and the internal status bus connected to the address output;

a third processor having a clock, an address output, a data input/output, and an internal data bus, the clock connected to the clock synchronization circuit, the address output connected to a second monitor circuit, the data input/output connected through the system data bus to the system memory, and the internal data bus connected to the address output; and as the clock synchronization circuit synchronizes the clock of the first, the second, and third processor in phase, the processors operate in lock step whereby the first processor sends out addresses for reading data from the system memory through its address output while the second processor sends out internal status data through its address output to the first monitor circuit and the third processor sends out internal data bus data through its address output to the second monitor circuit.

* * * * *